United States Patent [19]

Fedele

[11] Patent Number: 5,358,309

[45] Date of Patent: Oct. 25, 1994

[54] LOCK DEVICE FOR DECOMPOSABLE FURNITURE ELMENTS, IN PARTICULAR FOR WOODEN-FRAME CHAIRS, AND FURNISHING ITEM INCORPORATING SUCH A DEVICE

[75] Inventor: Franco Fedele, Manzano, Italy

[73] Assignee: Effedue S.r.l., Manzano, Italy

[21] Appl. No.: 982,720

[22] Filed: Nov. 27, 1992

[51] Int. Cl.⁵ .................................................. A47C 7/00
[52] U.S. Cl. .................................. 297/440.1; 403/252; 411/104; 411/539
[58] Field of Search ...................... 297/440, 443, 444; 411/104, 539, 540, 183, 108; 403/264, 252, 260

[56] References Cited

U.S. PATENT DOCUMENTS

| | | | |
|---|---|---|---|
| 3,979,149 | 9/1976 | Vogel | 297/440 X |
| 3,989,300 | 11/1976 | Heumann | 297/440 |
| 4,079,995 | 3/1978 | Beckley | 297/440 |
| 4,352,587 | 10/1982 | Milz | 403/252 |
| 4,577,906 | 3/1986 | Hsiung | 297/440 |
| 4,691,965 | 9/1987 | Hsiung | 207/440 |

FOREIGN PATENT DOCUMENTS

| | | | |
|---|---|---|---|
| 11484 | 10/1956 | Fed. Rep. of Germany | 297/440 |
| 7800010 | 2/1979 | Switzerland | 297/440 |
| 718958 | 11/1954 | United Kingdom | 411/539 |
| 2153214 | 8/1985 | United Kingdom | 297/440 |

Primary Examiner—Brian K. Green
Assistant Examiner—David E. Allred
Attorney, Agent, or Firm—Ladas & Parry

[57] ABSTRACT

A decomposable furnishing item wherein a number of separate elements are mutually connected by a number of joints, each defined by a first and at least a second element substantially perpendicular to each other, and by a device for mutually locking the elements; the device presenting a nut screw extending through the first element, and a screw assigned to the second element and engaging one end of the nut screw, the opposite end of which is fitted integral with a retaining plate cooperating with an axial stop on the first element and having a number of teeth fitted into the first element for angularly locking the nut screw.

16 Claims, 2 Drawing Sheets

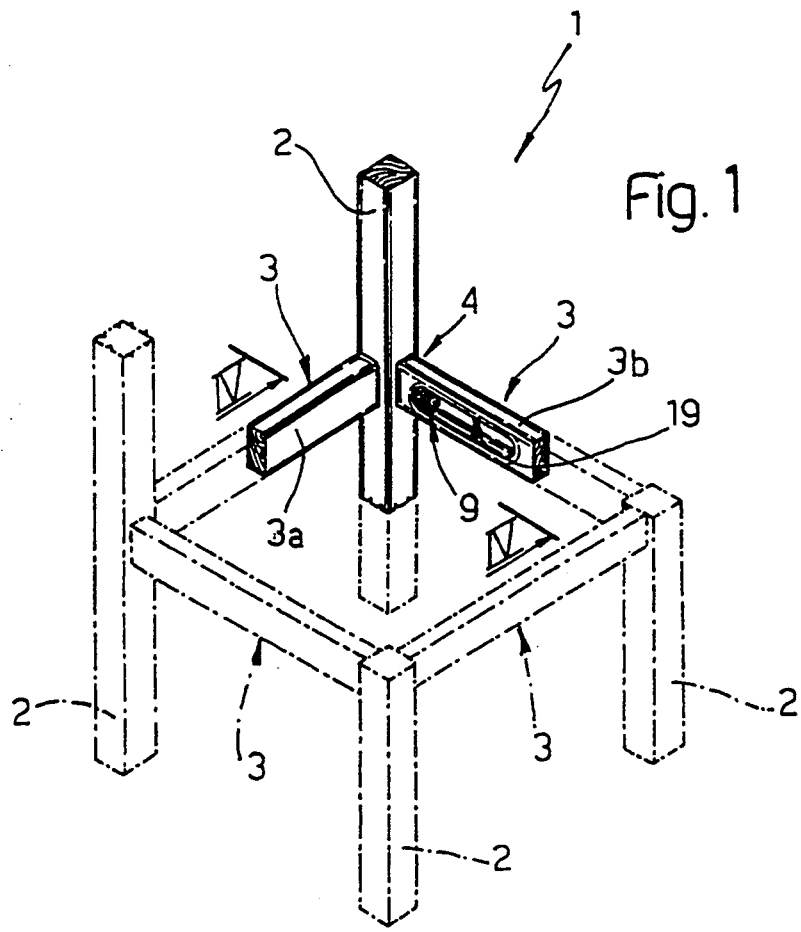
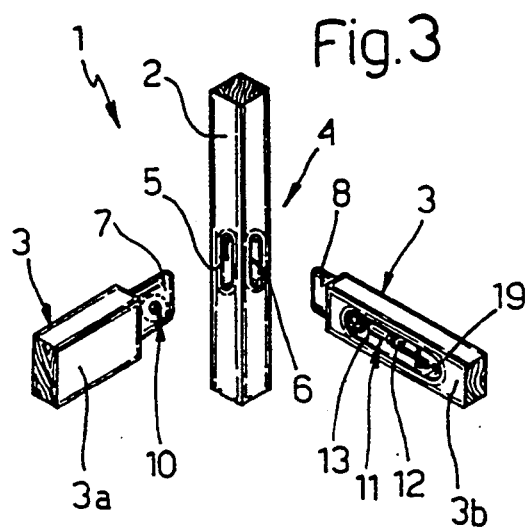
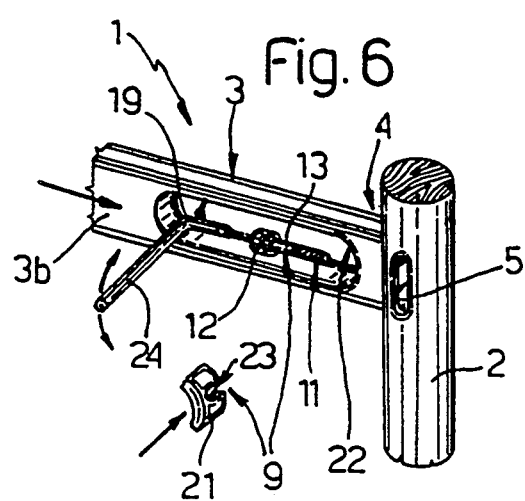

LOCK DEVICE FOR DECOMPOSABLE FURNITURE ELMENTS, IN PARTICULAR FOR WOODEN-FRAME CHAIRS, AND FURNISHING ITEM INCORPORATING SUCH A DEVICE

BACKGROUND OF THE INVENTION

The present invention relates to a lock device for decomposable furniture elements, particularly for wooden-frame chairs, and to a furnishing item incorporating such a device.

In the following description, reference is made purely by way of example to a decomposable wooden-frame chair.

Decomposable wooden-frame chairs are normally assembled by means of a number of joints, each defined by a first and at least a second substantially perpendicular element, and by means for locking the elements together in a releasable manner.

In most cases, the lock means consists of self-threading wood screws screwed through the elements, or of screw-nut lock devices between two or more elements.

Known lock devices comprise a threaded nut connected to a first of the elements, normally by means of adhesive or by fitting it inside a respective seat; and a screw fitted in rotary manner to the second element, having a head cooperating with an axial stop on the second element, and designed to engage the nut screw for mutually connecting the two elements.

Though widely used, known lock devices of the aforementioned type are invariably unreliable as regards long-term performance, especially when used for connecting elements made of wood or similar. In fact, in general, the design characteristics of known devices, and especially the self-threading screws, fail to maintain the initial connection of the elements substantially unchanged alongside variations in the geometric and dimensional characteristics of the elements caused, for example, by aging of the material.

SUMMARY OF THE INVENTION

It is an object of the present invention to provide a lock device designed to overcome the aforementioned drawbacks.

According to the present invention, there is provided a lock device for decomposable furniture elements, in particular for wooden-frame chairs; said device comprising a nut screw for a first element for connection; and a screw for a second element for connection; the screw being designed to engage the nut screw and to contact a first axial stop on said second element; characterized by the fact that said nut screw is designed to extend transversely through said first element; and by the fact that it comprises plate means on said nut, designed to cooperate with a second stop formed on the first element for axially locking the nut in relation to the first element; said nut presenting, at one end, a threaded hole engaged by said screw, and being integral with said plate means at the opposite end; and angular retaining means being provided for angularly securing said nut in relation to said first element.

Said plate means preferably comprise a plate designed to contact said second stop and supporting said angular retaining means.

According to a preferred embodiment of the present invention, said angular retaining means comprise at least a pair of teeth, each extending from the same side of said plate as said nut, each substantially perpendicular to said plate, and each designed to penetrate inside said first element.

The present invention also relates to a decomposable furnishing item.

According to the present invention, there is provided a decomposable furnishing item comprising a number of elements, in particular wooden elements; and a number of joints for mutually connecting said elements; each joint comprising a first and at least a second element substantially perpendicular to each other, and a lock device for releasably connecting said elements; characterized by the fact that said second element presents a first axial stop, and said first element presents a first transverse through hole substantially aligned with the second element, and a second axial stop formed on the opposite side of said first element in relation to the second element; said device comprising a nut engaging said first hole; a screw cooperating with said first axial stop and engaging said nut; and plate means integral with said nut, located on the opposite side of said nut in relation to said screw, and contacting said second stop for axially securing the nut in relation to the first element; angular retaining means being provided for angularly locking said nut in relation to said first element.

BRIEF DESCRIPTION OF THE DRAWINGS

A non-limiting embodiment of the present invention will be described by way of example with reference to the accompanying drawings, in which:

FIG. 1 is a perspective view of a preferred embodiment of the furnishing item according to the teachings of the present invention;

FIG. 3 is an exploded view in perspective of a portion of the FIG. 1 item;

FIG. 6 shows one stage in the assembly of the of FIG. 1 furnishing item.

DETAILED DESCRIPTION OF THE INVENTION

Figure 2:
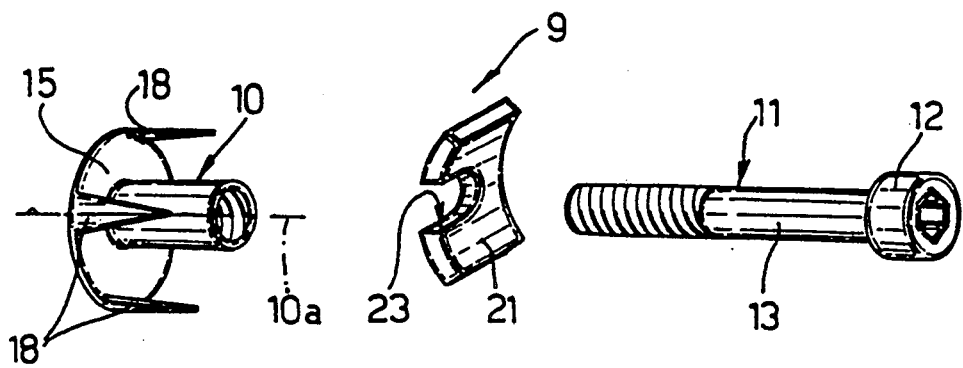
FIG. 2 is an exploded view in perspective of a preferred embodiment of the device according to the present invention.
Figure 4:
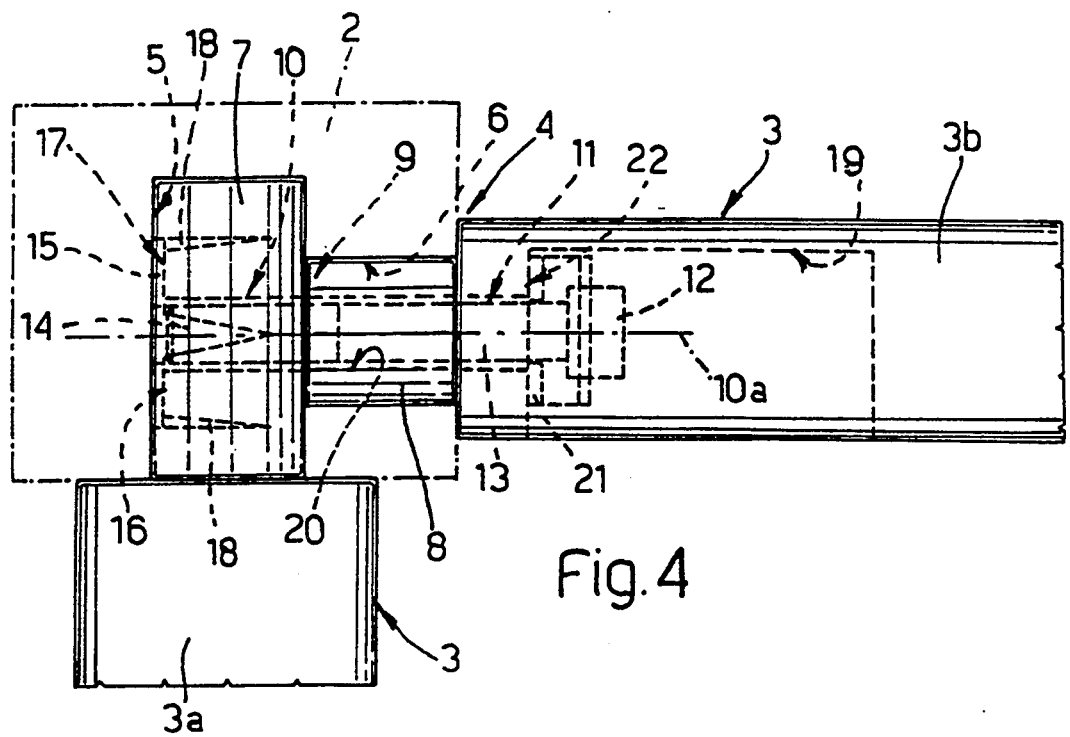
FIG. 4 shows an enlarged section taken along line IV—IV in FIG. 1.

Numeral 1 in FIGS. 1, 3 and 6 indicates a chair comprising a number of vertical members 2; a number of cross members 3 perpendicular to one another and each extending perpendicular to vertical members 2; and a number of joints 4 connecting cross members 3 to one another and to vertical members 2. More specifically, each joint 4 comprises first and second cross member ends 3a and 3b, and a vertical member 2 having a pair of seats or mortises 5 and 6 with their respective axes substantially perpendicular to each other and to the axis of respective vertical member 2. Each seat 5, 6 is engaged in slightly tight-fitting manner by a respective end portion 7, 8 of respective cross member ends 3a, 3b.

Each joint 4 also comprises a lock device 9 for mutually locking cross member ends 3a and 3b to respective vertical member 2.

Figure 5:
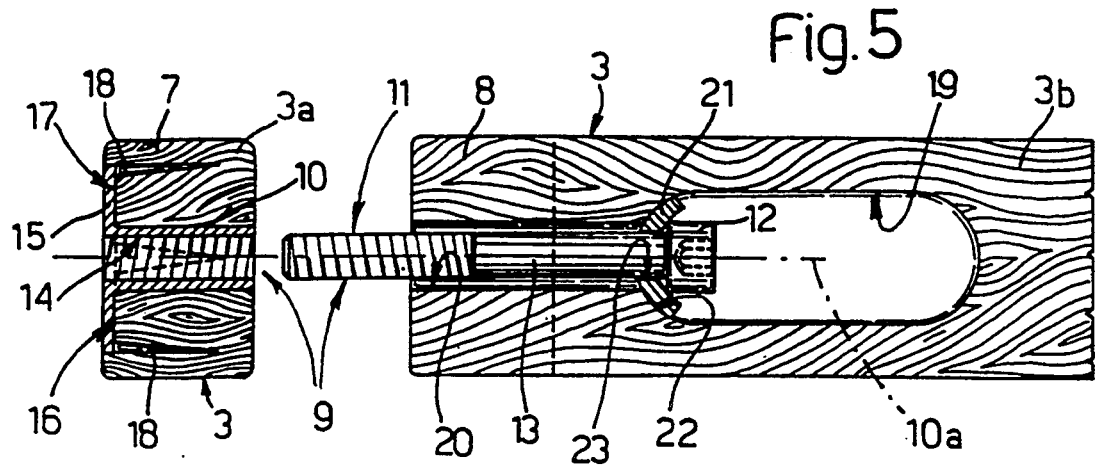
FIG. 5 shows the elements of the device in FIG. 2 attached to respective elements of the furnishing item in FIG. 1.

As shown in FIGS. 2 and 5, device 9 comprises a nut threaded 10 having an axis 10a and assigned to cross member end 3a; and a screw 11 comprising a cylindrical hexagonal-socket head 12, and a partially threaded shank 13 designed to engage a threaded hole in nut 10. More specifically, nut 10 is formed as an internally threaded cylindrical tubular body adapted for engaging in a respective hole 14 formed through portion 7 of cross member end 3a on the axis of the cross member end 3a, the tubular body of nut 10 having an end portion engaged by screw 11, and an opposite end portion integral with a retaining plate 15 extending perpendicular to axis 10a.

Plate 15 is housed inside a seat 16 on the opposite side of cross member end 3a in relation to respective cross member end 3b, for contacting an axial stop 17 defined by the end wall of seat 16, for axially securing nut 10 in relation to cross member end 3a. Plate 15 is provided with four integral teeth 18 equally spaced about a peripheral annular portion of plate 15, extending substantially parallel to axis 10a from the same side of plate 15 as the cylindrical body of nut 10. The teeth 18 are embedded in portion 7 for angularly locking nut 10 in relation to cross member end 3a.

As shown in FIGS. 2 and 5, cross member end 3b presents an intermediate axial cavity 19 formed close to portion 8 and which, when viewed from the front, is substantially rectangular in shape with curved oppositely-concave shorter sides.

Cross member 3b also has an axial hole 20 slightly larger in diameter than head 12 of screw 11 and formed substantially through portion 8 into communication with cavity 19. Hole 20 is engaged loosely by shank 13 of screw 11, a threaded portion of which projects outwards of portion 8, and the head 12 of which is housed inside cavity 19. In use, head 12 cooperates frictionally with a cylindrical locating plate 21 interposed between head 12 and an axial stop 22 defined by a curved inner surface portion of cavity 19.

Plate 21 presents the same bend radius as the short sides of cavity 19, with its concavity facing head 12, and plate 21 has an opening 23 extending from a curved side of plate 21 and the transverse dimension of which is approximately equal to but no smaller than the diameter of shank 13 and smaller than the diameter of head 12 of screw 11.

With reference, for the sake of simplicity, to only one of joints 4, prior to inserting portion 7 inside seat 5, nut 10 is inserted inside hole 14 through seat 16; plate 15 is inserted inside seat 16 and teeth 18 driven into portion 7 until plate 15 contacts shoulder 17; portion 7 is inserted inside seat 5; screw 11 is screwed partially into nut 10; cross member end 3b is positioned coaxially with screw 11 and pushed towards vertical member 2 so as to insert head 12 of screw 11 inside cavity 19 through hole 20; plate 21 is inserted transversely in relation to screw 11 (FIG. 6) between shoulder 22 and head 12 of screw 11, so that shank 13 engages in opening 23; and, using an Allen wrench 24 (FIG. 6), screw 11 is screwed further into nut 10 so as to tighten cross member ends 3a and 3b into contacting relation with each other and with vertical member 2.

Lock device 9 thus provides an extremely sturdy, longlasting connection for furniture in general, and chairs in particular, by virtue of plate 15 providing at all times for axially locking of nut 10 in relation to respective cross member ends 3a, and by virtue of nut 10 being locked angularly by teeth 18, which, as shown in the accompanying drawings, tend to increasingly engage respective cross member end 3a when there is an increase in the pull exerted by screw 11, thus reinforcing the angular constraint even when making adjustments to the connection.

What is claimed is:

1. A decomposable furniture item comprising first, second and third elements extending substantially perpendicularly to one another, and a joint connecting said elements together with the third element gripped between the first and second elements, said joint comprising a lock device releasably connecting said three elements together, said second element having a first axial stop, said first element having a transverse hole substantially aligned with the second element, and a second axial stop formed on a side of said first element remote from said second element, said lock device including a threaded nut engaged in said hole in said first element, a screw engaged in said second element and cooperating with said first axial stop to threadably engage said nut, and plate means integral with said nut at an end thereof remote from said screw and in engagement with said second axial stop for axially securing said nut in relation to said first element, and angular retaining means for angularly retaining said nut in relation to said first element, said third element housing, at least partially, said nut and said plate means.

2. A decomposable furniture item as claimed in claim 1, wherein said plate means and said angular retaining means are attached together.

3. A decomposable furniture item as claimed in claim 1, wherein said angular retaining means comprises a plurality of teeth integral with said plate means and extending therefrom in the direction towards said screw for engaging said first element.

4. A decomposable furniture item as claimed in claim 3, wherein said nut comprises a threaded tubular body having an axis, said plate means comprising a plate extending substantially perpendicular to said axis of the tubular body, said teeth being integral with said plate and projecting perpendicularly thereto, said first element having a seat with an end wall defining said second stop, said plate engaging said seat.

5. A decomposable furniture item as claimed in claim 3, wherein said teeth are embedded in said first element and progressively and positively engage said first element as said screw exerts increasing pull on said nut.

6. A decomposable furniture item as claimed in claim 1, wherein said screw includes a shank having a threaded portion, and a cylindrical head having a diameter greater than that of said shank, said second element having an elongated cavity in which said head is received, and a second axial hole, substantially coaxial with said nut and connected to said cavity, said shank being loosely engaged in said second hole and projecting from said second element into threaded engagement with said nut, said head then being engaged with said first stop.

7. A decomposable furniture item as claimed in claim 6, further comprising locating means interposed between said first stop and said head.

8. A decomposable furniture item as claimed in claim 7, wherein said locating means comprises a curved plate having a concave face facing said head, said curved plate having a transverse slot extending from one side edge of said curved plate over a distance approximately equal to but no less than the diameter of said shank.

9. A decomposable furniture item as claimed in claim 6, wherein said second hole has a diameter greater than that of said head.

10. A decomposable furniture item as claimed in claim 1, wherein said furniture item comprises a chair, said first, second and third elements being wooden frame elements of said chair.

11. A decomposable furniture item as claimed in claim 10, wherein said third element is a vertical element and said first and second elements are horizontal elements.

12. A lock device for decomposably connecting together three furniture elements of a furniture item in a relationship in which said three elements extend substantially perpendicular to one another, said lock device comprising a threaded nut connected to said first element, a screw connected to said second element and projecting from said second element through at least part of said third element to threadably engage said nut and grip the third element between the first and second elements, a first axial stop in said second element for engagement by said screw, said nut extending transversely through said first element, plate means on said nut and housed within said third element, a second stop on said first element engaging said plate means to axially lock said nut in relation to said first element, said nut having at one end a threaded hole engaged by said screw, said plate means being integral with said nut at an end thereof remote from said one end, said nut comprising a tubular body projecting axially from said plate means through said first element, said tubular body being provided with said threaded hole which is open at said one end for receiving said screw, said plate means extending perpendicularly to said tubular body at a distance from said open end of the threaded hole, and angular retaining means for angularly securing said nut in relation to said first element.

13. A lock device as claimed in claim 12, wherein said plate means and said angular retaining means are attached together.

14. A lock device as claimed in claim 13, wherein said angular retaining means comprises a plurality of teeth integral with said plate means and extending therefrom in the same direction as said tubular body for engaging said first element.

15. A lock device as claimed in claim 12, wherein said screw comprises a substantially cylindrical head and a shank including a threaded portion, said lock device further comprising a locating element interposed between said first stop and said head.

16. A lock device as claimed in claim 15, wherein said locating element comprises a curved plate having a concave face facing said head, said curved plate having a transverse slot extending from one side edge of said curved plate over a distance approximately equal to but no less than the diameter of said shank.

* * * * *